UNITED STATES PATENT OFFICE.

JOSEPH P. RUTH, JR., OF DENVER, COLORADO.

PROCESS FOR MINERAL FLOTATION.

1,356,832.　　　　　Specification of Letters Patent.　　Patented Oct. 26, 1920.

No Drawing.　　Application filed February 21, 1920. Serial No. 360,369.

*To all whom it may concern:*

Be it known that I, JOSEPH P. RUTH, Jr., a citizen of the United States, residing at the city and county of Denver, State of Colorado, have invented certain new and useful Improvements in Processes for Mineral Flotation; and I do hereby declare the following to be a full, clear, and exact description of the invention, such as will enable others skilled in the art to practise the same.

The object of this invention is to provide a cheap and efficient method for mineral separation by the so-called flotation process. The invention comprises the use of naphthalene in solution or diffused in small amount in a liquid such as water, which diffusion approaches a solution.

For instance, a solution of a small quantity of naphthalene in gasolene may be used. Or, the naphthalene may be boiled in water, or ground in water, or ground and allowed to stand in water. I have found that each of these liquids produces very efficient flotation work. A uniform bubble of ideal size is produced, and the effects of over-oiling, where bubbles produced are too small, are entirely avoided. The cost is very low as compared with the commonly used oils which are expensive.

In preparing a solution of the naphthalene in gasolene or the like, any simple method and means to obtain the solution may be employed. The resulting solution is added to the pulp prepared for flotation in the usual manner. In diffusing the naphthalene in water or a similar liquid, the naphthalene may be boiled in the water and the water added to the pulp, or the steam and vapor arising from boiling water containing naphthalene may be condensed and allowed to drip into the pulp. Again, the naphthalene may be ground very fine and allowed to stand in water for twenty-four hours or longer, with the result that a colloidal condition is approached which gives splendid results. A similar condition is had by grinding the naphthalene fine with the ore in the presence of water, running the pulp through a thickener, and using the solution containing the naphthalene over and over. In this manner about 80% of said solution may be kept in circuit for at least 24 hours, with the result that a high degree of diffusion or dispersion of the naphthalene in the water is obtained.

If desired to improve the diffusion of the naphthalene in water a small amount of sodium carbonate, $Na_2CO_3$, may be added especially where the naphthalene and water are boiled together.

I claim:

1. A flotation process comprising the addition of naphthalene to the pulp as a frothing agent, aerating the pulp to form a mineral-collecting froth, and collecting the froth so formed.

2. A flotation process comprising the addition of naphthalene in diffused form to the pulp as a frothing agent, aerating the pulp to form a mineral-collecting froth, and collecting the froth so formed.

3. A flotation process comprising the addition to the mineral to be floated of naphthalene contained in a liquid as a frothing agent, aerating the pulp to form a mineral-collecting froth, and collecting the froth so formed.

4. A flotation process comprising the addition to the mineral to be floated of a liquid containing naphthalene and sodium carbonate as a frothing agent, aerating the pulp to form a mineral-collecting froth, and collecting the froth so formed.

5. A flotation process comprising the addition to the mineral to be floated of naphthalene and sodium carbonate, aerating the pulp to form a mineral-collecting froth, and collecting the froth so formed.

In testimony whereof I affix my signature.

JOSEPH P. RUTH, JR.